United States Patent Office 3,301,890
Patented Jan. 31, 1967

3,301,890
PROCESS FOR THE STABILIZATION OF ACRYLONITRILE
Marcel Borrel, Oullins, and Jean Konareff, Venissieux, France, assignors to Societe d'Electro-Chimie, d'Electro-Metallurgie et des Acieries Electriques d'Ugine, Paris, France, a corporation of France
No Drawing. Filed Dec. 9, 1963, Ser. No. 329,260
Claims priority, application France, Dec. 14, 1962, 918,674
2 Claims. (Cl. 260—465.9)

This invention is concerned with the stabilization of cyanohydrins. More particularly, it is concerned with the stabilization of cyanohydrins obtained from aldehydes and ketones in mixtures containing these substances together with a nitrile.

The preparation of cyanohydrins through condensation of an aldehyde or ketone with hydrocyanic acid is generally effected in the presence of an alkaline catalyst so as to increase the rate of reaction. Moreover, it is generally carried out at a low temperature so as to obtain the highest possible conversion. This conversion may be as high as 99% especially in the case of aldehydes.

As soon as equilibrium is reached, the catalyst must be neutralized. This is accomplished by the addition of sufficient acid to acidify the reaction mixture so as to stabilize the cyanohydrin by preventing a reverse shift of the equilibrium as a result of polymerization or resinification of uncondensed ingredients in the mixture. This is especially important at relatively high temperature.

In the past, acidification has been effected by the addition of an inorganic acid such as sulfuric or phosphoric. But this has not always been convenient, especially in cases of preparation of unsaturated nitriles by oxidation of unsaturated hydrocarbons or aldehydes in the presence of ammonia. In these processes, during the purification of the gaseous mixture issuing from the reactor, a liquid organic phase is obtained which contains carbonyl compounds, hydrocyanic acid and other impurities in addition to the desired nitrile.

The purification of the foregoing mixtures by formation of a cyanohydrin through reaction of the principal impurities, for example acrolein and hydrocyanic acid is well known. The cyanohydrin is formed by the addition of an alkaline catalyst which catalyzes the reaction. The mixture may then be purified, for example by distillation to separate the nitrile from the cyanohydrin.

Sulphuric, phosphoric or any of the acids generally used to stabilize the cyanohydrin cannot be used with the above described organic layers since they tend to dehydrate the organic layer and also form a separate aqueous phase which does not penetrate the organic layer it is supposed to neutralize.

The principal object of this invention accordingly is to provide a simple, efficient process for the stabilization of cyanohydrins which overcomes at least some of the disadvantages in the prior process noted above.

It is a further object of the invention to provide a simple efficient procedure for the purification of nitrile mixtures containing carbonyl compounds and hydrocyanic acid.

This invention accordingly comprises the novel processes and steps of processes, specific embodiments of which are described hereinafter by way of example and in accordance with which we now prefer to practice the invention.

In accordance with this invention cyanohydrins in alkaline catalyzed organic mixtures containing nitriles are stabilized by adding to the mixture at least one organic acid of low volatility which is appreciably soluble in the mixture and strong enough to have a dissociation constant about that of sulfuric or phosphoric acid. Relatively involatile acids are preferred so that they will not be distilled out of the mixture during purification. High solubility is preferred so as to insure sufficient acidity in the organic phase to effect stabilization.

Suitable acids for carrying out the process of this invention include organic sulfonic acids, preferably aromatic including, for example benzenesulfonic, toluenesulfonic and as an especially preferred acid, para toluenesulfonic acid. These acids are generally solid at ambient temperatures. They are introduced into the mixture to be purified in a portion of the nitrile, for example. Alternatively, they may be added in aqueous solution since they do not cause separation from the organic phase treated.

The amount of organic acid employed depends upon the amount of alkaline catalyst already present. It is generally preferred to add sufficient acid to bring the pH of the mixture to a value below about 4.4.

The following example illustrates the manner in which we now prefer to practice the invention. It is to be understood that it is not to be considered as limiting the invention, except as indicated in the appended claims.

Example 1

A crude liquid mixture was available which contained:

| | Percent |
|---|---|
| Acrylonitrile | 82.7 |
| Acrolein | 5.8 |
| Hydrocyanic acid | 6.5 |
| Water | 5 | not including various impurities such as related nitriles.

This liquid phase was treated at 10° C. with an aqueous solution of 40% sodium hydroxide in order to form the cyanohydrin of acrolein.

To stabilize the organic phase para toluenesulfonic acid was added in the form of a 30% by weight aqueous solution until a pH of 3.2 was attained.

The liquid so stabilized was fed continuously at a rate of 100 kg./hour to a distillation column. The temperature at the bottom of the column was 70° C., and at the top 30° C.; the pressure was 150 mm. Hg.

The following products were obtained:

At the column head a gaseous mixture containing 75.2 kg./hour of acrylonitrile, 3.72 kg./hour of hydrocyanic acid and 5 kg./hour of water, less than 0.03 kg./hour of acrolein, not including the bulk of the other volatile impurities.

At the bottom of the column a mixture containing 7.5 kg./hour of acrylonitrile, 8.58 kg./hour of acrolein cyanohydrin, the non-volatile impurities and a small fraction of volatile impurities introduced.

By comparison, had the column been fed with the non-stabilized organic phase resulting from the treatment of the crude liquid with alkali solution, practically the whole of the components fed to the column would have escaped overhead without elimination of the acrolein condensation of these vapors would have given a new liquid phase practically identical with the liquid introduced into the column.

We claim:
1. A process for purifying acrylonitrile which comprises adding an alkaline catalyst to a mixture consisting essentially of a major amount of acrylonitrile and minor amounts of acrolein, hydrocyanic acid, and water to form the corresponding cyanohydrin, stabilizing said cyanohydrin-containing mixture by the addition of benzene sulfonic acid or toluene sulfonic acid to lower the pH of the mixture to below about 4.4, and distilling off purified acrylonitrile.

2. A process according to claim 1 in which the aromatic sulfonic acid is paratoluene sulfonic acid.

References Cited by the Examiner

UNITED STATES PATENTS

| | | | |
|---|---|---|---|
| 2,175,805 | 10/1939 | Jacobson | 260—465.6 XR |
| 3,057,903 | 10/1962 | Nemec et al. | 260—465.6 |
| 3,155,601 | 11/1964 | Idol | 260—465.9 XR |
| 3,185,636 | 5/1965 | Stevens et al. | 260—465.9 XR |

CHARLES B. PARKER, *Primary Examiner.*

JOSEPH P. BRUST, *Examiner.*